US 11,898,461 B2

(12) United States Patent
Duan et al.

(10) Patent No.: US 11,898,461 B2
(45) Date of Patent: Feb. 13, 2024

(54) AXIAL FLOW TURBINE (71) Applicant: Mitsubishi Power, Ltd., Yokohama (JP)

(72) Inventors: Chongfei Duan, Tokyo (JP); Hideaki Sugishita, Tokyo (JP); Kazuyuki Matsumoto, Tokyo (JP); Hideki Ono, Tokyo (JP); Yoshihiro Kuwamura, Tokyo (JP); Kiyoshi Segawa, Yokohama (JP); Hisataka Fukushima, Yokohama (JP)

(73) Assignee: MITSUBISH HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/628,401

(22) PCT Filed: Jul. 30, 2020

(86) PCT No.: PCT/JP2020/029279
§ 371 (c)(1),
(2) Date: Jan. 19, 2022

(87) PCT Pub. No.: WO2021/020518
PCT Pub. Date: Feb. 4, 2021

(65) Prior Publication Data
US 2022/0268161 A1  Aug. 25, 2022

(30) Foreign Application Priority Data
Jul. 31, 2019 (JP) ................... 2019-141489

(51) Int. Cl.
F01D 5/22 (2006.01)
F01D 5/20 (2006.01)
(Continued)

(52) U.S. Cl.
CPC ............... *F01D 5/225* (2013.01); *F01D 5/20* (2013.01); *F01D 11/02* (2013.01); *F16J 15/4472* (2013.01)

(58) Field of Classification Search
CPC . F01D 11/02; F01D 5/225; F01D 5/20; F01D 11/08; F01D 11/122; F01D 11/127; (Continued)

(56) References Cited

U.S. PATENT DOCUMENTS 4,362,465 A    12/1982  Riollet et al.
2006/0104805 A1  5/2006  Gummer
(Continued)

FOREIGN PATENT DOCUMENTS

CN   104632296        5/2015
DE   10 2004 030 597  1/2006
(Continued)

OTHER PUBLICATIONS

International Search Report dated Sep. 24, 2020 in corresponding International Application No. PCT/JP2020/029279.
(Continued)

Primary Examiner — Christopher Verdier
Assistant Examiner — Michael K. Reitz
(74) Attorney, Agent, or Firm — Wenderoth, Lind & Ponack, L.L.P.

(57) ABSTRACT

A steam turbine provided with: a rotor; a plurality of movable blades each of which has a movable blade body and a shroud, and which are circumferentially arranged at intervals; a casing that has a recessed section for accommodating the shroud; fins that form clearances from the outer circumferential surface of the shroud; a stator blade support part disposed on the downstream side of the recessed section; a plurality of stator blades circumferentially arranged at intervals; and an annular partition plate that extends from a
(Continued)

recessed section downstream surface toward the upstream side thereof. The casing has formed therein a bypass flow passage that communicates a region radially outside of the partition plate and a region between the stator blades.

9 Claims, 10 Drawing Sheets (51) Int. Cl.
*F01D 11/02* (2006.01)
*F16J 15/447* (2006.01)
(58) Field of Classification Search
CPC . F01D 11/04; F01D 11/06; F01D 9/06; F04D 29/681; F16J 15/4472
See application file for complete search history.

(56) References Cited

U.S. PATENT DOCUMENTS

| | | |
|---|---|---|
| 2009/0317232 A1 | 12/2009 | Guemmer |
| 2013/0094945 A1 | 4/2013 | Kuwamura et al. |
| 2013/0149124 A1 | 6/2013 | Kuwamura et al. |
| 2014/0119901 A1* | 5/2014 | Shibata .................. F01D 9/041 415/173.1 |
| 2015/0132114 A1* | 5/2015 | Fukushima ............. F01D 11/08 415/168.1 |
| 2017/0016342 A1 | 1/2017 | Shibata et al. |
| 2018/0156050 A1 | 6/2018 | Koda |

FOREIGN PATENT DOCUMENTS

| | | |
|---|---|---|
| DE | 10 2008 029 605 | 12/2009 |
| EP | 1 767 746 | 3/2007 |
| EP | 2871324 | 5/2015 |
| JP | 55-500757 | 10/1980 |
| JP | 2006-138259 | 6/2006 |
| JP | 2007-321721 | 12/2007 |
| JP | 2011-247158 | 12/2011 |
| JP | 2012-62863 | 3/2012 |
| JP | 2014-47692 | 3/2014 |
| JP | 2015-94220 | 5/2015 |
| JP | 2018-040282 | 3/2018 |
| JP | 2019-35347 | 3/2019 |

OTHER PUBLICATIONS

Written Opinion of the International Searching Authority dated Sep. 24, 2020 in corresponding International Application No. PCT/JP2020/029279.

* cited by examiner

AXIAL FLOW TURBINE

TECHNICAL FIELD

The present invention relates to an axial flow turbine. This application claims the right of priority based on Japanese Patent Application No. 2019-141489 filed on Jul. 31, 2019, the entire content of which is incorporated herein by reference.

BACKGROUND ART

An axial flow turbine that includes a turbine for a steam turbine or a gas turbine has a configuration in which a rotor is rotatably supported by a bearing in a casing and multiple stages of rotating blades are fixed to the rotor while multiple stages of stator blades are fixed to the casing so as to be located between the multiple stages of rotating blades. Then, when steam is supplied from a turbine inlet of the casing, the steam passes through the plurality of rotating blades and the plurality of stator blades, so that the rotor is driven and rotated through the multiple stages of rotating blades, and the steam is then discharged to the outside from a discharge port.

In a steam turbine, in order to realize smooth rotation of a rotor, a certain clearance is provided between a tip portion (a shroud) of a rotating blade and an inner peripheral surface of a casing. The steam passing through the clearance passes through the rotating blades to a downstream side as a leak flow without giving rotational energy to the rotor. Here, in general, a loss caused by the energy of the leak flow not being effectively used as the rotational power of the turbine is called a bypass loss, a loss occurring when the leak flow flows into a main flow path after passing through the clearance is called a mixing loss, and a loss caused by the leak flow flowing into the main flow path interfering with a blade row on the downstream side is called an interference loss. In order to reduce this mixing loss, as in PTL 1, there is a method of providing a member for restricting the direction of the leak flow to a downstream end portion of a rotating blade shroud to adjust the direction of the leak flow to the direction of a main flow.

CITATION LIST

Patent Literature

[PTL 1] Japanese Unexamined Patent Application Publication No. 2019-35347

SUMMARY OF INVENTION

Technical Problem

The technique of PTL 1 is effective in reducing the mixing loss. However, it is difficult to always match the leak flow, which is a flow from an outer periphery side of a rotating rotating blade row toward a stator blade row, which is a stationary member that is located downstream, with the direction of the main flow, which passes between the rotating blade rows disposed at regular intervals in a circumferential direction and is non-uniform in the circumferential direction, and the interference loss also occurs in the stator blade row on the downstream side.

The present invention has been made to solve the above problems, and has an object to provide an axial flow turbine in which efficiency is improved by reducing the influence of an interference loss while reducing a mixing loss.

Solution to Problem

According to an aspect of the present invention, there is provided an axial flow turbine including: a rotor extending along an axis; a plurality of rotating blades each having a rotating blade body extending from the rotor to an outer side in a radial direction and a shroud provided at an end portion on an outer side in the radial direction of the rotating blade body, and arranged at intervals in a circumferential direction; a casing surrounding the rotating blades from the outer side in the radial direction and having a recessed portion formed on an inner peripheral surface to accommodate the shrouds; a fin protruding from a facing surface of the recessed portion, which faces the shroud, toward an inner side in the radial direction, and forming a clearance between the fin and an outer peripheral surface of the shroud; a stator blade support portion disposed on a downstream side with respect to the recessed portion on the inner peripheral surface of the casing; a plurality of stator blades each extending from the stator blade support portion toward the inner side in the radial direction and arranged at intervals in the circumferential direction; and an annular partition plate extending from a recessed portion downstream surface, which is a surface on the downstream side of the recessed portion, toward an upstream side and centered on the axis, in which a bypass flow path, which makes a region on the outer side in the radial direction with respect to the partition plate in the recessed portion downstream surface and a region between the stator blades on the inner peripheral surface of the casing communicate with each other, is formed in the casing.

A flow (a main flow) that flows between the rotating blade bodies adjacent to each other and a flow (a leak flow) that is branched from the main flow and that flows into the recessed portion are formed inside the axial flow turbine. The leak flow passes through the clearance and then forms a vortex that swirls in the direction from the recessed portion downstream surface toward the facing surface. A component of a part of the vortex interferes with the leak flow that flows in from the clearance to form another vortex. This small vortex merges with the main flow, whereby there is a case of causing a mixing loss. However, in the above configuration, the component of a part of the leak flow is directly led to the region between the stator blades through the bypass flow path. Therefore, it is possible to suppress the occurrence of the small vortex due to the interference between the leak flow and the vortex as described above. Further, since the main flow that includes the small vortex is not uniform in the circumferential direction and has a swirling component around the rotor, the direction of the flow flowing into the stator blade row pulsates. However, since a relative position of a bypass flow path outlet with respect to the stator blade is constant, the leak flow can always be supplied from a certain relative position to the stator blade as a flow in a certain direction.

In the above axial flow turbine, the bypass flow path may extend from the outer side toward the inner side in the radial direction while going from the upstream side toward the downstream side, when viewed in a cross section that includes the axis.

According to the above configuration, it is possible to cause the bypass flow path to lead a part of the leak flow in the recessed portion to the region between the stator blades at a shorter distance. On the other hand, for example, in a case where the bypass flow path is bent at an intermediate position, the flow is obstructed at the bent portion, so that the leak flow cannot be efficiently bypassed. According to the above configuration, such a probability can be reduced.

In the above axial flow turbine, the bypass flow path may extend toward a rear side in a rotation direction of the rotor while going from the upstream side toward the downstream side, when viewed from the outer side in the radial direction.

According to the above configuration, the bypass flow path extends toward the rear side in the rotation direction of the rotor while going from the upstream side toward the downstream side. In this way, it is possible to reduce an inflow angle (incidence) of the flow with respect to the stator blade on the downstream side. As a result, the flow of a fluid in the axial flow turbine can be further smoothed.

In the above axial flow turbine, when a dimension of the stator blade support portion in a direction of the axis is denoted by L and a dimension from an end edge on the upstream side of the stator blade support portion to an end portion on the downstream side of the bypass flow path is denoted by A, a value of A/L may satisfy a relationship of 0<A/L<0.15.

According to the above configuration, the value of A/L satisfies the relationship of 0<A/L<0.15, whereby the end portion on the downstream side of the bypass flow path is formed at the position biased toward the upstream side between the stator blades. Therefore, it is possible to reduce the incidence of the flow flowing out from the bypass flow path with respect to the stator blade.

In the above axial flow turbine, when a dimension of the stator blade support portion in a direction of the axis is denoted by L and a dimension from an end edge on the upstream side of the stator blade support portion to an end portion on the downstream side of the bypass flow path is denoted by A, a value of A/L may satisfy a relationship of 0.2<A/L<0.4.

According to the above configuration, the value of A/L satisfies the relationship of 0.2<A/L<0.4, whereby the end portion on the downstream side of the bypass flow path is formed at the position biased toward the downstream side between the stator blades. Therefore, a secondary flow occurring on the downstream side of the stator blade can be blown off by the flow flowing out from the bypass flow path. In this way, it is possible to suppress a decrease in the efficiency of the axial flow turbine due to the influence of the secondary flow.

In the above axial flow turbine, the recessed portion downstream surface may be located on the downstream side with respect to an end edge on the upstream side of the stator blade in a direction of the axis.

According to the above configuration, the recessed portion downstream surface is located on the downstream side with respect to the end edge on the upstream side of the stator blade in the direction of the axis. In this way, the distance in the direction of the axis between the rotating blade and the stator blade can be reduced. As a result, a loss can be further reduced compared to, for example, a case where the distance in the direction of the axis is large.

In the above axial flow turbine, a flow path cross-sectional area of the bypass flow path may gradually decrease while going from the upstream side toward the downstream side.

According to the above configuration, the cross-sectional area of the bypass flow path gradually decreases while going from the upstream side toward the downstream side. In this way, the flow velocity of the fluid that is blown out from the bypass flow path can be increased. As a result, the incidence on the stator blade can be further optimized, and the influence of the secondary flow occurring around the stator blade can be further reduced.

In the above axial flow turbine, the bypass flow path may have a circular cross-sectional shape.

According to the above configuration, since the cross-sectional shape of the bypass flow path is a circular shape, processing can be performed more easily compared to, for example, a case where the cross-sectional shape is a rectangular shape. In this way, manufacturing costs or maintenance costs can be reduced.

In the above axial flow turbine, the axial flow turbine may further include a plurality of swirling prevention plates extending from an outer peripheral surface of the partition plate toward an inner peripheral surface of the recessed portion and arranged at intervals in the circumferential direction.

According to the above configuration, a swirling component in the circumferential direction of a flow in the recessed portion can be reduced by the swirling prevention plate.

Advantageous Effects of Invention

According to the present invention, it is possible to provide an axial flow turbine in which efficiency is improved by reducing the influence of an interference loss while reducing a mixing loss.

DESCRIPTION OF EMBODIMENTS

First Embodiment

Figure 1:
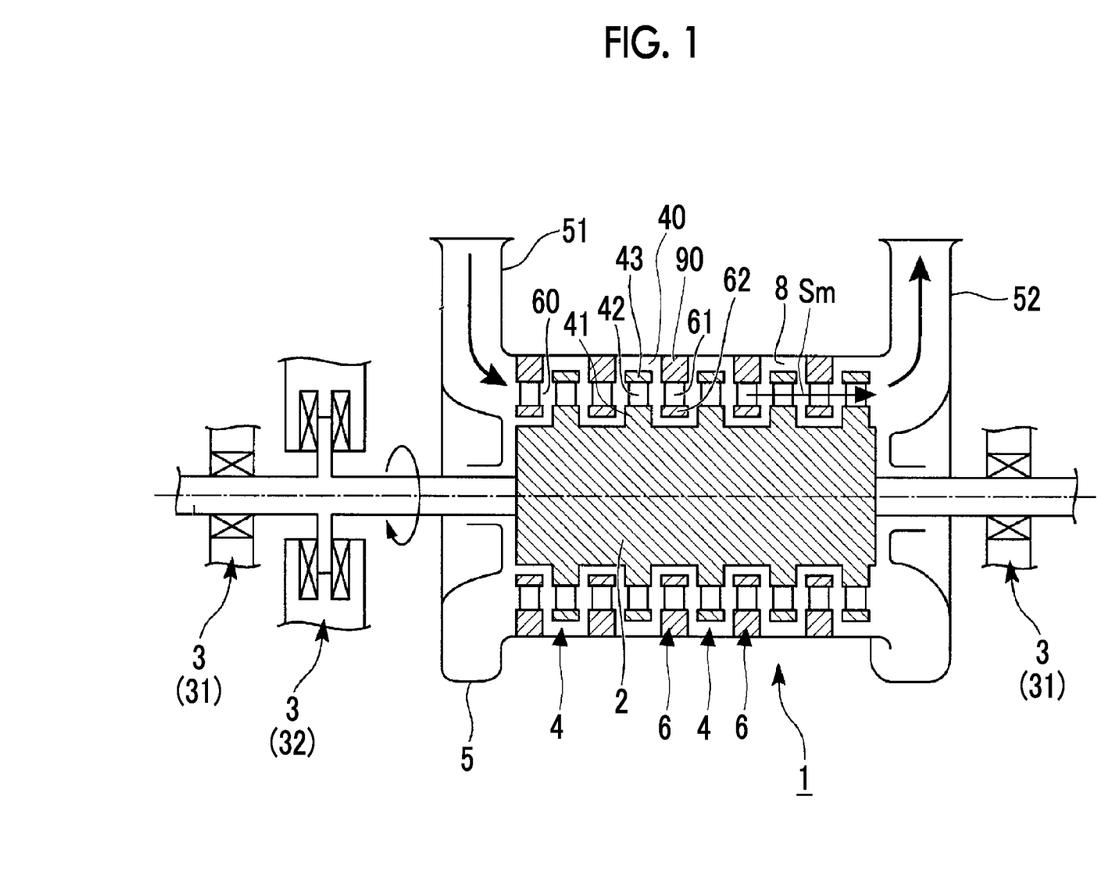
FIG. 1 is a sectional view showing a configuration of a steam turbine (an axial flow turbine) according to a first embodiment of the present invention.

A first embodiment of the present invention will be described with reference to FIGS. 1 to 3. In the present embodiment, a steam turbine 1 will be described as an example of an axial flow turbine. In addition to the steam turbine 1, it is also possible to apply a turbine for a gas turbine as the axial flow turbine. As shown in FIG. 1, the steam turbine 1 includes a rotor 2, a bearing device 3, a plurality of rotating blade rows 4, a casing 5, a plurality of stator blade rows 6, and a fin 7 (refer to FIG. 2). The rotor 2 has a columnar shape extending along an axis O. The bearing device 3 supports a shaft end of the rotor 2. The bearing device 3 has a pair of journal bearings 31 and only one thrust bearing 32. The pair of journal bearings 31 are respectively provided at end portions on both sides in the direction of the axis O of the rotor 2. Each of the journal bearings 31 supports a load in a radial direction with respect to the axis O. The thrust bearing 32 is provided only on one side in the direction of the axis O. The thrust bearing 32 supports a load in the direction of the axis O. The plurality of rotating blade rows 4 arranged at intervals in the direction of the axis O are provided on an outer peripheral surface of the rotor 2. Each of the rotating blade rows 4 has a plurality of rotating blades 40 arranged at intervals in a circumferential direction with respect to the axis O. The rotating blade 40 has a rotating blade platform 41, a rotating blade body 42, and a rotating blade shroud 43 (a shroud). The rotating blade platform 41 protrudes from the outer peripheral surface of the rotor 2 to an outer side in the radial direction. The rotating blade body 42 is mounted to the outer peripheral surface of the rotating blade platform 41. The rotating blade body 42 extends in the radial direction and has an airfoil-shaped cross-sectional shape when viewed from the radial direction. The rotating blade shroud 43 is mounted to an end portion on the outer side in the radial direction of the rotating blade body 42.

The rotor 2 and the rotating blade rows 4 (the rotating blades 40) are surrounded by the casing 5 from the outer side in the radial direction. The casing 5 has a tubular shape centered on the axis O. The plurality of stator blade rows 6 arranged at intervals in the direction of the axis O are provided on an inner peripheral surface of the casing 5. The stator blade rows 6 are arranged alternately with the rotating blade rows 4 in the direction of the axis O. Each of the stator blade rows 6 has a plurality of stator blades 60 arranged at intervals in the circumferential direction with respect to the axis O. The stator blade 60 has a stator blade body 61, a stator blade inner ring 62, and a stator blade support portion 90. The stator blade body 61 is mounted to the stator blade support portion 90. The stator blade support portion 90 is a region between recessed portions 8 on the inner peripheral surface of the casing 5. The stator blade body 61 extends in the radial direction from an inner peripheral surface of the stator blade support portion 90, and has an airfoil-shaped cross-sectional shape when viewed from the radial direction. The stator blade inner ring 62 is mounted to an end portion on an inner side in the radial direction of the stator blade body 61. The recessed portion 8 recessed from the inner peripheral surface of the casing 5 toward the outer side in the radial direction is formed between a pair of stator blades 60 adjacent to each other on the inner peripheral surface of the casing 5. The rotating blade shroud 43 described above is accommodated in the recessed portion 8.

A turbine inlet 51 for introducing high-temperature and high-pressure steam supplied from the outside is formed at an end portion on one side in the direction of the axis O of the casing 5. An exhaust hood 52 for discharging the steam that has passed through the inside of the casing 5 is formed at an end portion on the other side in the direction of the axis O of the casing 5. The steam introduced from the turbine inlet 51 alternately collides with the plurality of rotating blade rows 4 (the rotating blades 40) and the plurality of stator blade rows 6 (the stator blades 60) while passing through the inside of the casing 5 from one side toward the other side in the direction of the axis O. In this way, rotational energy is given to the rotor 2. The rotation of the rotor 2 is taken out from the shaft end and used for driving of, for example, a generator (not shown), or the like. In the following description, the flow of the steam flowing through the inside of the casing 5 from one side toward the other side in the direction of the axis O is referred to as a main flow Fm. Further, a side from which the main flow Fm flows (one side in the direction of the axis O) is referred to as an upstream side, and a side to which the main flow Fm flows (the other side in the direction of the axis O) is referred to as a downstream side.

Subsequently, the configuration of a periphery of the recessed portion 8 will be described with reference to FIG. 2. FIG. 2 is an enlarged view showing the periphery of the recessed portion 8 in a cross section which includes the axis O. As shown in this drawing, the recessed portion 8 is recessed in a square groove shape from the inner peripheral surface of the casing 5 (a casing inner peripheral surface 5A) toward the outer side in the radial direction. The recessed portion 8 has a first region 81 and a second region 82 that is located on the downstream side of the first region 81. As will be described in detail later, the first region 81 and the second region 82 are separated by a casing-side fin 71. A surface facing the downstream side (that is, a surface that is located on the upstream side in the first region 81), among the surfaces forming the first region 81, is regarded as a recessed portion upstream surface 8A. A surface facing the inner side in the radial direction, among the surfaces forming the first region 81, is regarded as a facing surface 8B. The facing surface 8B extends along the axis O. The facing surface 8B faces an outer peripheral surface of the rotating blade shroud 43 (a shroud outer peripheral surface 43A) from the outer side in the radial direction. In the present embodiment, the recessed portion upstream surface 8A and the facing surface 8B are orthogonal to each other when viewed in a cross section.

A plurality of (two as an example) casing-side fins 71 (fins 7) arranged at intervals in the direction of the axis O are provided on the facing surface 8B. The number of casing-side fins 71 may be three or more. Each of the casing-side fins 71 has a plate shape extending from the facing surface 8B toward the inner side in the radial direction. A gap (clearance C) extending in the radial direction is formed between a tip portion of each of the casing-side fins 71 and the shroud outer peripheral surface 43A. Further, a rotating blade-side fin 72 (fin 7) is provided on the shroud outer peripheral surface 43A between the two casing-side fins 71. The rotating blade-side fin 72 has a plate shape extending from the shroud outer peripheral surface 43A to the outer side in the radial direction. A gap (clearance C) extending in the radial direction is formed between a tip portion of the rotating blade-side fin 72 and the facing surface 8B.

Next, the configuration of the second region 82 will be described. The second region 82 is separated from the first region 81 with the casing-side fin 71 (a downstream-side fin 71D) which is located on the most downstream side, of the two casing-side fins 71, interposed therebetween. The second region 82 is defined by a fin downstream surface 71S that is a surface facing the downstream side of the downstream-side fin 71D, a recessed portion downstream surface 8D that faces the fin downstream surface 71S from the direction of the axis O, a downstream-side facing surface 8C that faces the inner side in the radial direction, a part on the downstream side of the shroud outer peripheral surface 43A, and a partition plate 70 (described later).

The partition plate 70 extends from an end edge on the innermost side in the radial direction of the recessed portion downstream surface 8D toward the upstream side, and has a ring shape centered on the axis O. The partition plate 70 is located on a slightly inner side in the radial direction with respect to the shroud outer peripheral surface 43A. The inner peripheral surface of the partition plate 70 is flush with the casing inner peripheral surface 5A described above. An outer peripheral surface of the partition plate 70 faces the downstream-side facing surface 8C from the radial direction. More specifically, when viewed in a cross section that includes the axis O, the outer peripheral surface of the partition plate 70 extends parallel to the downstream-side facing surface 8C.

A swirling prevention plate 80 is provided between the outer peripheral surface of the partition plate 70 and the downstream-side facing surface 8C. As will be described in detail later, the swirling prevention plate 80 is provided in order to remove a swirling component from the flow of the steam that flows toward the downstream side through the clearance C between the downstream-side fin 71D and the shroud outer peripheral surface 43A described above. (The swirling component is a velocity component remaining in the leaked steam). As shown in FIG. 3, the swirling prevention plate 80 extends in the radial direction from the outer peripheral surface of the partition plate 70 toward the downstream-side facing surface 8C (the inner peripheral surface of the recessed portion 8), and a plurality of swirling prevention plates 80 are arranged at intervals in the circumferential direction with respect to the axis O. Further, an end edge on the downstream side of the swirling prevention plate 80 (that is, the recessed portion downstream surface 8D) is located on the upstream side with respect to a leading edge Ef of the stator blade body 61.

Figure 2:
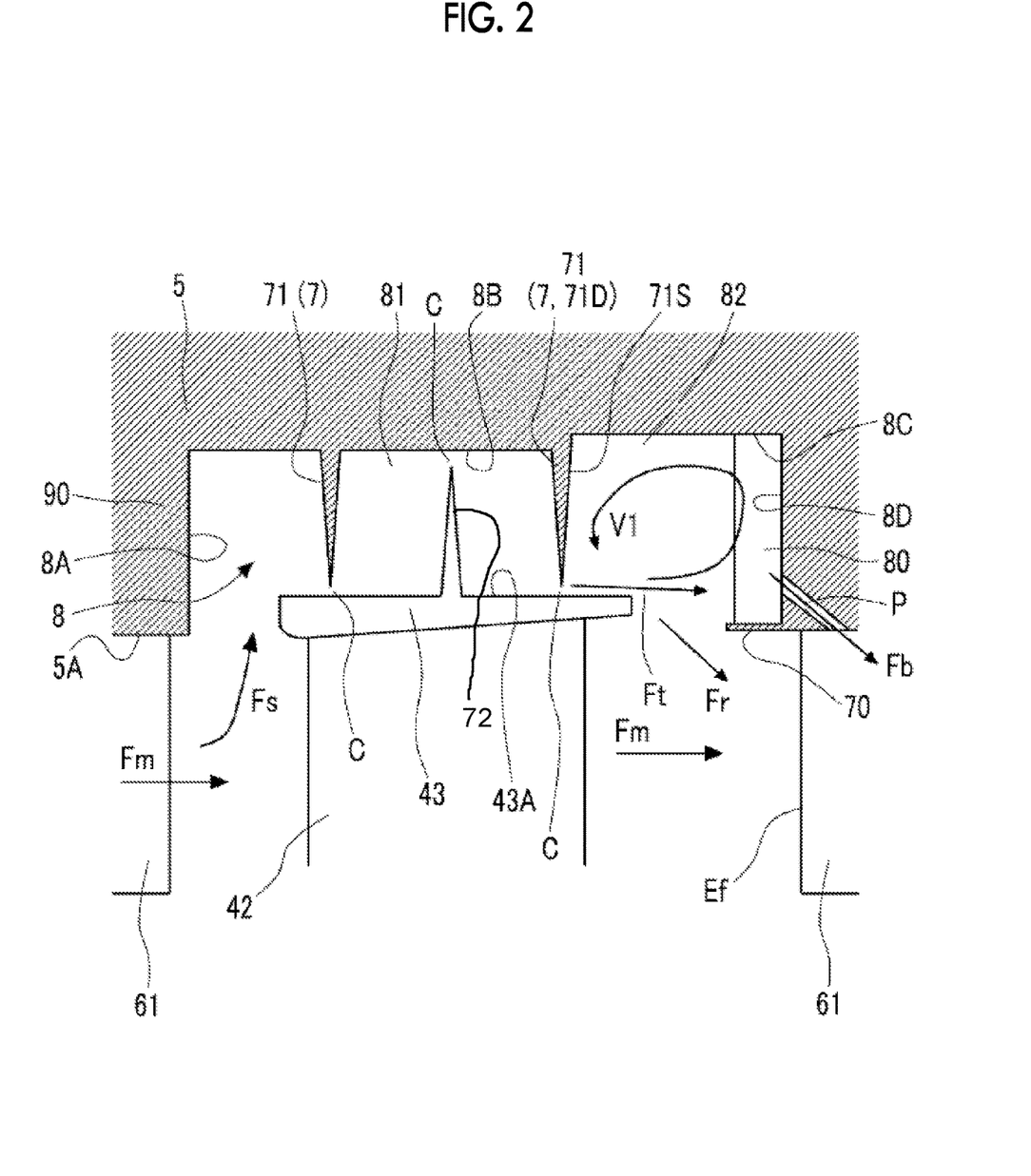
FIG. 2 is an enlarged sectional view of a main part of the steam turbine according to the first embodiment of the present invention.
Figure 3:
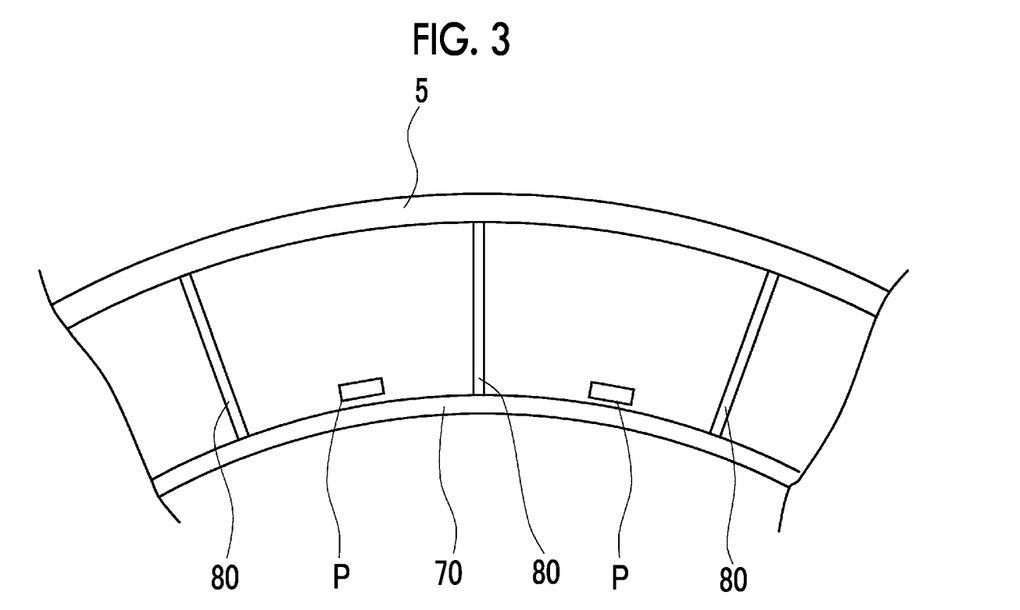
FIG. 3 is a diagram showing a recessed portion downstream surface of the steam turbine according to the first embodiment of the present invention, as viewed from an upstream side.

As shown in FIG. 2 or 3, a bypass flow path P that makes the recessed portion downstream surface 8D and the casing inner peripheral surface 5A communicate with each other is formed in the casing 5 (the stator blade support portion 90). The bypass flow path P extends from the outer side toward the inner side in the radial direction while going from the upstream side toward the downstream side, when viewed in a cross section that includes the axis O. An end portion on the upstream side of the bypass flow path P is open in a region on the outer side in the radial direction with respect to the partition plate 70 in the recessed portion downstream surface 8D and in a region between the swirling prevention plates 80. The end portion on the upstream side of the bypass flow path P is located on the outer side in the radial direction with respect to the shroud outer peripheral surface 43A in the radial direction. An end portion on the downstream side of the bypass flow path P is open in a region between the stator blades 60 in the casing inner peripheral surface 5A. The end portion on the downstream side of the bypass flow path P is located on the downstream side with respect to a leading edge of the stator blade 60. In the present embodiment, the bypass flow path P extends parallel to the axis O when viewed from the outer side in the radial direction with respect to the axis O. Further, as shown in FIG. 3, the end portion on the upstream side of the bypass flow path P is formed at a central position between the pair of swirling prevention plates 80 adjacent to each other.

Subsequently, the operation of the steam turbine 1 according to the present embodiment will be described. When operating the steam turbine 1, steam is supplied from an external steam supply source (a boiler or the like) into the casing 5 through the turbine inlet 51 described above. The steam forms the main flow Fm from the upstream side toward the downstream side in the casing 5. The main flow Fm passes between the plurality of stator blade rows 6 and between the plurality of rotating blade rows 4 while passing through the inside of the casing 5. The steam passes between the stator blade rows 6, so that the flow velocity of steam increases. The rectified steam flow collides with the rotating blade row 4, so that rotational energy is given to the rotor 2.

Here, a part of the main flow Fm flows into the recessed portion 8 described above to form a leak flow Fs. More specifically, the leak flow Fs flows into the first region 81 through the gap between the recessed portion upstream surface 8A of the recessed portion 8 and the rotating blade shroud 43. A component of a part of the leak flow Fs is blocked by the fins 7 described above. On the other hand, the residual component of the leak flow Fs flows into the second region 82 on the downstream side through the clearance C between the casing-side fin 71 and the shroud outer peripheral surface 43A and the clearance C between the rotating blade-side fin 72 and the facing surface 8B.

The component of a part of the leak flow Fs flowing into the second region 82 flows along the outer peripheral surface of the partition plate 70 described above, the recessed portion downstream surface 8D, the downstream-side facing surface 8C, and the fin downstream surface 71S in this order. In this way, a vortex V1 as shown in FIG. 2 is formed in the second region 82. A swirling component that swirls in a rotation direction of the rotating blade body 42 and the rotating blade shroud 43 is included in the leak flow Fs with the rotation of the rotating blade body 42 and the rotating blade shroud 43. Most of the swirling components are removed because of collision with the swirling prevention plate 80 described above.

The residual component that has not become the vortex V1, among all the components of the leak flow Fs, flows from the shroud outer peripheral surface 43A to the downstream side toward the outer peripheral surface of the partition plate 70 as a penetration flow Ft. The penetration flow Ft merges with the vortex V1, and then a component of a part of the penetration flow Ft becomes a return flow Fr and merges with the main flow Fm again. On the other hand, the residual component of the penetration flow Ft further flows toward the downstream side and flows into the bypass flow path P. The flow flowing into the bypass flow path P is gradually led from the outer side to the inner side in the radial direction while flowing along the bypass flow path P, and becomes a bypass flow Fb. The bypass flow Fb merges with the main flow Fm between the stator blades 60.

As described above, the flow (the main flow Fm) flowing between the rotating blade bodies 42 adjacent to each other and the flow (the leak flow Fs) branched from the main flow Fm and flowing into the recessed portion 8 are formed inside the steam turbine 1. The leak flow Fs passes through the clearance C, and then forms the vortex V1 that swirls in the direction from the recessed portion downstream surface 8D toward the downstream-side facing surface 8C. The component of a part of the vortex V1 interferes with the leak flow Fs flowing in from the clearance C to further form another vortex (small vortex). This small vortex merges with the main flow Fm, whereby there is a case where a mixing loss occurs. However, in the above configuration, the component of a part of the leak flow Fs is directly led to the region between the stator blades 60 through the bypass flow path P. Therefore, it is possible to suppress the occurrence of the small vortex due to the interference between the leak flow Fs and the vortex V1 as described above, and the mixing loss due to this. As a result, the efficiency of the steam turbine 1 can be further improved.

Further, in the above configuration, the bypass flow path P extends from the outer side toward the inner side in the radial direction while going from the upstream side toward the downstream side, when viewed in a cross section that includes the axis O. According to this configuration, a part of the leak flow Fs flowing in the recessed portion 8 can be led to the region between the stator blades 60 at a shorter distance because of the bypass flow path P. On the other hand, for example, in a case where the bypass flow path P is bent at an intermediate position, the flow is obstructed at the bent portion, so that the leak flow Fs cannot be efficiently bypassed. According to the above configuration, such a probability can be reduced.

In addition, according to the above configuration, by providing the swirling prevention plate 80, it is possible to reduce the swirling component in the circumferential direction of the flow in the recessed portion 8. In this way, the performance of the steam turbine 1 can be further improved.

The first embodiment of the present invention has been described above. Various changes or modifications can be made to the above configuration without departing from the gist of the present invention. For example, in the first embodiment, the configuration has been described in which in addition to the bypass flow path P, the swirling prevention plate 80 is provided. However, it is also possible to adopt a configuration in which the swirling prevention plate 80 is not provided. Even in this case, since the swirling component of the leak flow Fs can be sufficiently removed by the bypass flow path P, it is possible to reduce the mixing loss described above.

Second Embodiment

Figure 4:
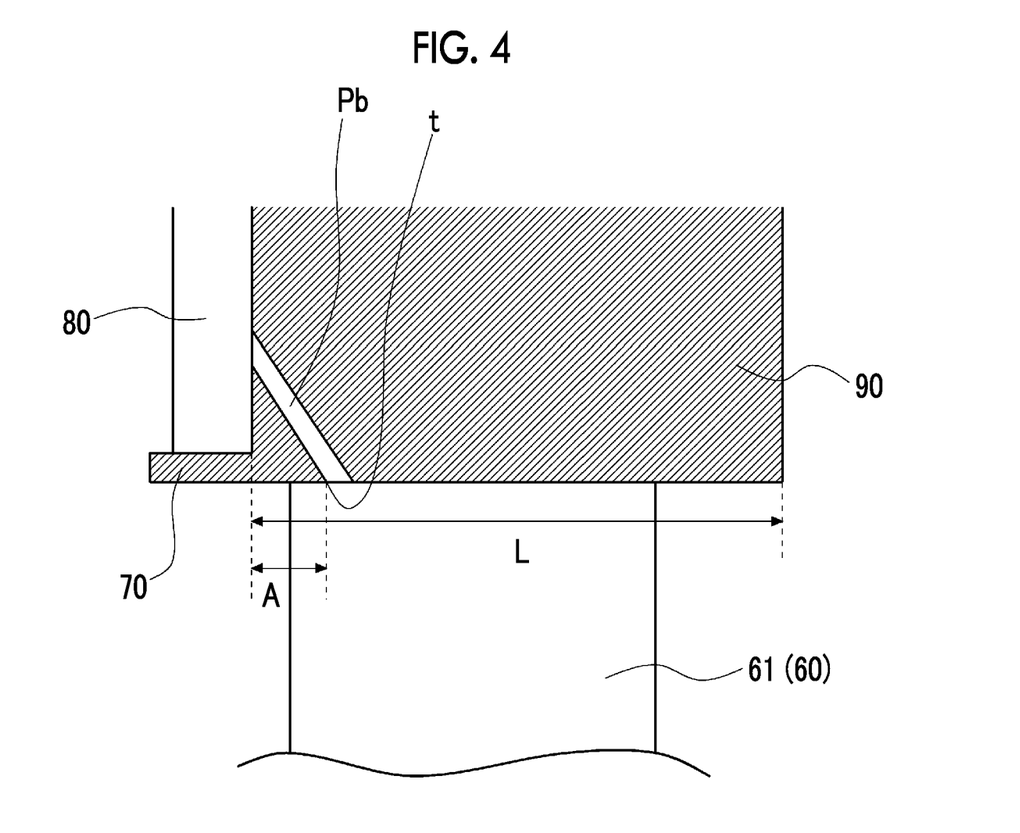
FIG. 4 is an enlarged sectional view of a main part of the steam turbine according to a second embodiment of the present invention.

Next, a second embodiment of the present invention will be described with reference to FIG. 4. The same configurations as those in the first embodiment described above are denoted by the same reference numerals, and detailed description thereof is omitted. As shown in FIG. 4, in the present embodiment, the position of an end portion t on the downstream side of a bypass flow path Pb is different from that in the first embodiment. Specifically, when the dimension of the stator blade support portion 90 in the direction of the axis O is denoted by L and the dimension from an end edge on the upstream side of the stator blade support portion 90 to the end portion t is denoted by A, the value of A/L satisfies a relationship of 0<A/L<0.15. More preferably, the value of A/L is regarded as 0.05<A/L<0.10. Most preferably, the value of A/L is regarded as A/L=0.08. That is, the end portion t on the downstream side of the bypass flow path Pb is formed at the position biased toward the upstream side in the inner peripheral surface of the stator blade support portion 90.

Figure 5:
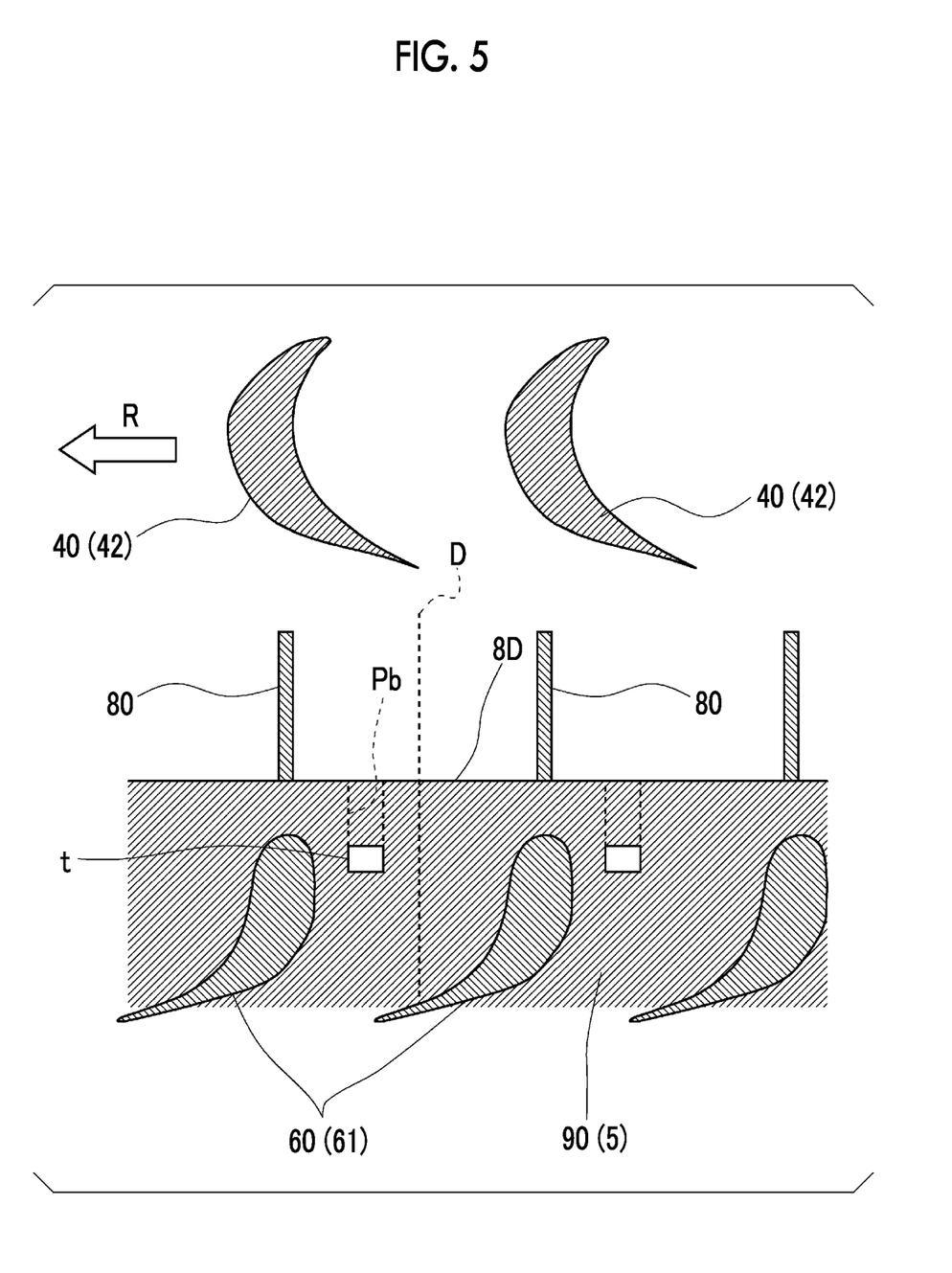
FIG. 5 is a diagram showing a casing of the steam turbine according to the second embodiment of the present invention, as viewed from an inner side in a radial direction.

Further, as shown in FIG. 5, in the present embodiment, when viewed from the inner side in the radial direction, the end portion t is formed at the position biased to one side in the circumferential direction between the swirling prevention plates 80 adjacent to each other. More specifically, the end portion t is formed at the position biased toward a front side in a rotation direction R of the rotor 2 with a bisector D between the swirling prevention plates 80 as the reference.

According to the above configuration, the value of A/L satisfies the relationship of 0<A/L<0.15, whereby the end portion t on the downstream side of the bypass flow path Pb is formed at the position biased to the upstream side between the stator blades 60. Therefore, an inflow angle (incidence) of the flow flowing out from the bypass flow path Pb with respect to the stator blade can be reduced. As a result, the flow of the main flow Fm in the steam turbine 1 is further smoothed, so that the efficiency of the steam turbine 1 can be further improved.

Further, as shown in FIG. 5, the position in the circumferential direction of the end portion t is regarded as the position close to a suction side (a negative pressure surface side) of the stator blade. The end portion t is open at this position, so that it is possible to suppress the occurrence of peeling near a leading edge on the suction side (the negative pressure surface side) of the stator blade.

Figure 6:
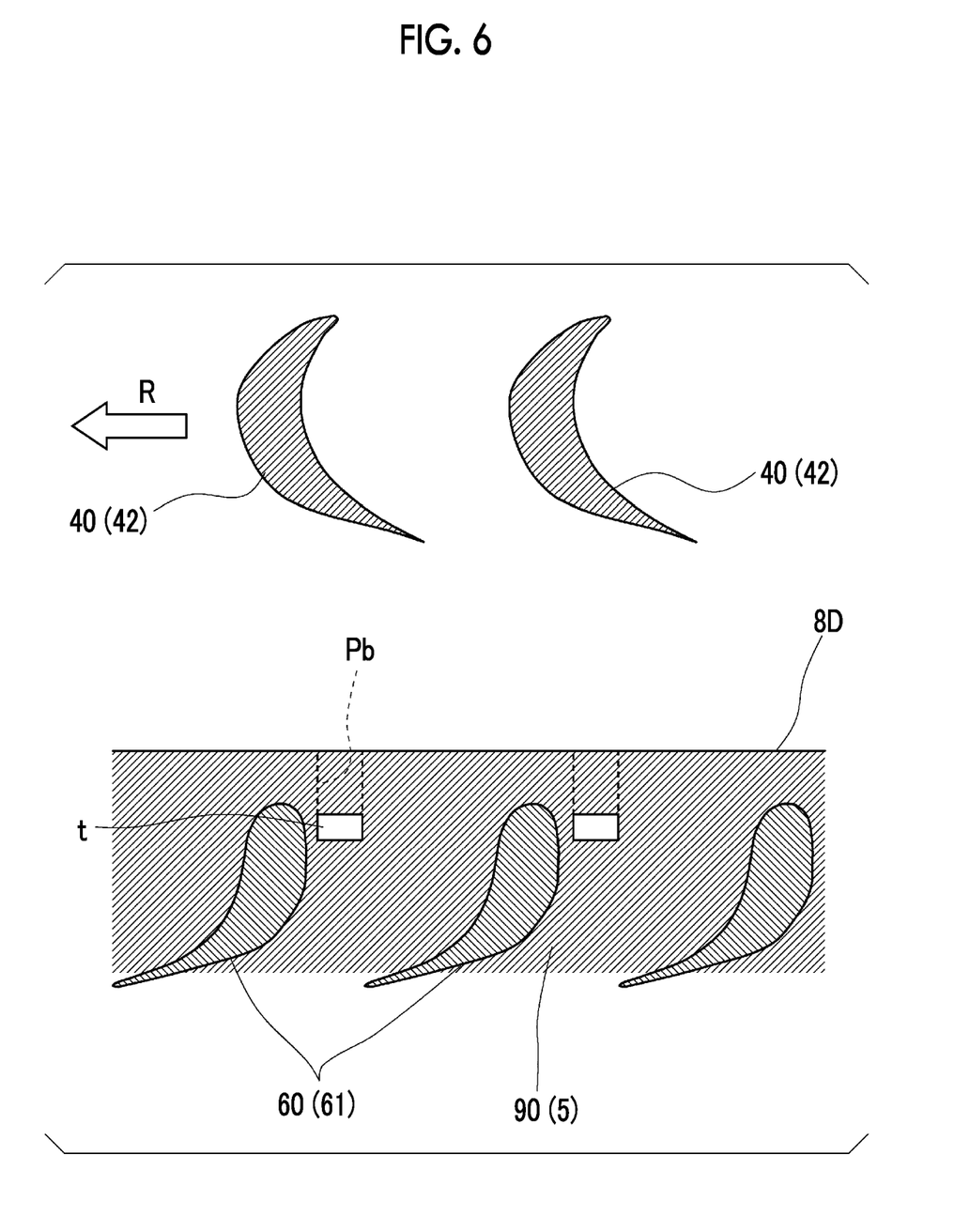
FIG. 6 is a diagram showing a casing of a steam turbine according to a modification example of the second embodiment of the present invention, as viewed from the inner side in the radial direction.

The second embodiment of the present invention has been described above. Various changes or modifications can be made to the above configuration without departing from the gist of the present invention. For example, in the second embodiment, the configuration in which the steam turbine 1 is provided with the swirling prevention plate 80 has been described. However, as shown in FIG. 6, it is also possible to adopt a configuration in which the swirling prevention plate 80 is not provided.

Third Embodiment

Figure 7:
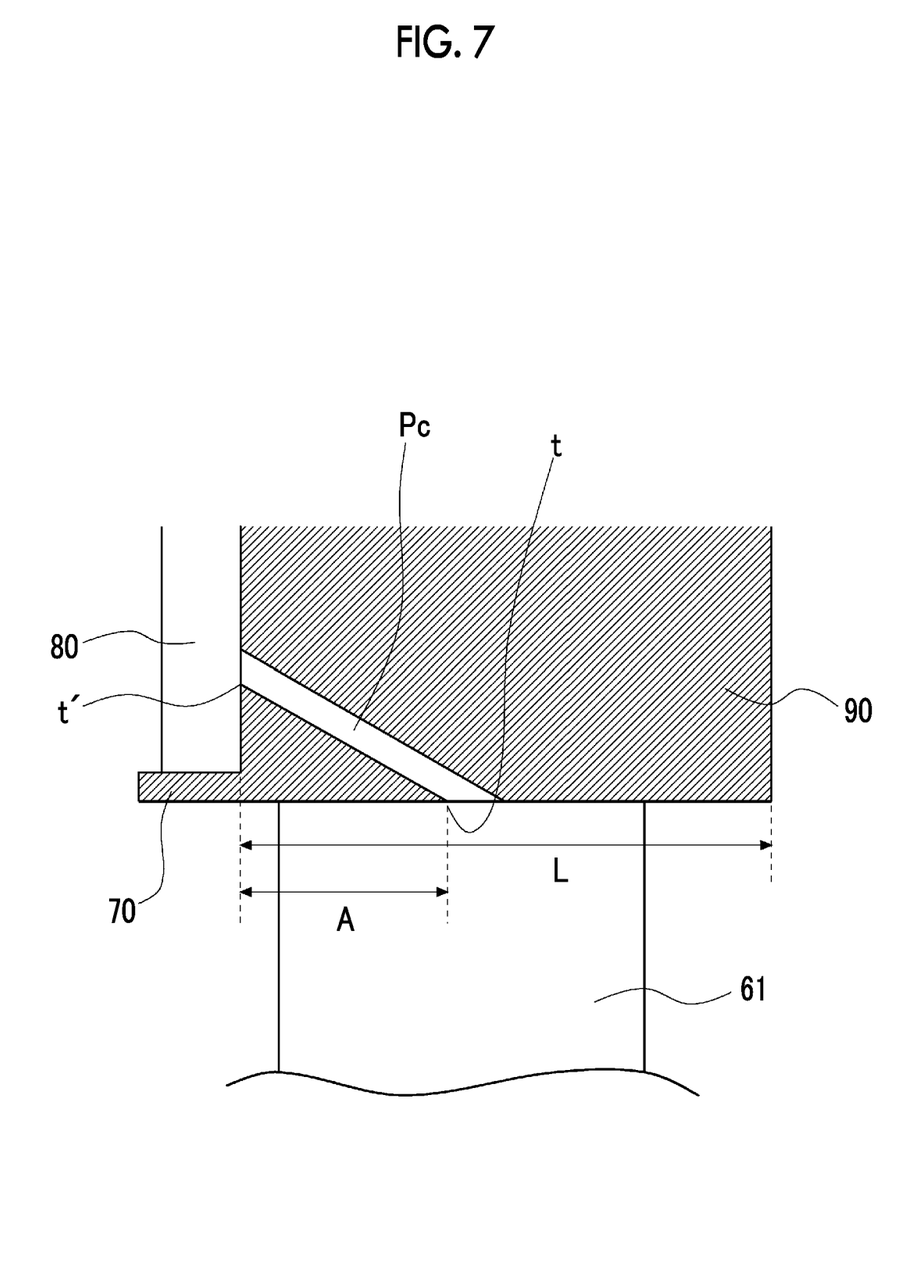
FIG. 7 is an enlarged sectional view of a main part of a steam turbine according to a third embodiment of the present invention.

Subsequently, a third embodiment of the present invention will be described with reference to FIGS. 7 and 8. The same configurations as those in each of the embodiments described above are denoted by the same reference numerals, and detailed description thereof is omitted. As shown in FIG. 7, in the present embodiment, the position of the end portion t on the downstream side of a bypass flow path Pc is different from that in each of the embodiments described above. Specifically, when the dimension of the stator blade support portion 90 in the direction of the axis O is denoted by L and the dimension from the end edge on the upstream side of the stator blade support portion 90 to the end portion t is denoted by A, the value of A/L satisfies a relationship of 0.2<A/L<0.4. More preferably, the value of A/L is regarded as 0.25<A/L<0.35. Most preferably, the value of A/L is regarded as 0.3. That is, the end portion t on the downstream side of the bypass flow path Pb is formed at the position biased toward the downstream side in the inner peripheral surface of the stator blade support portion 90.

Figure 8:
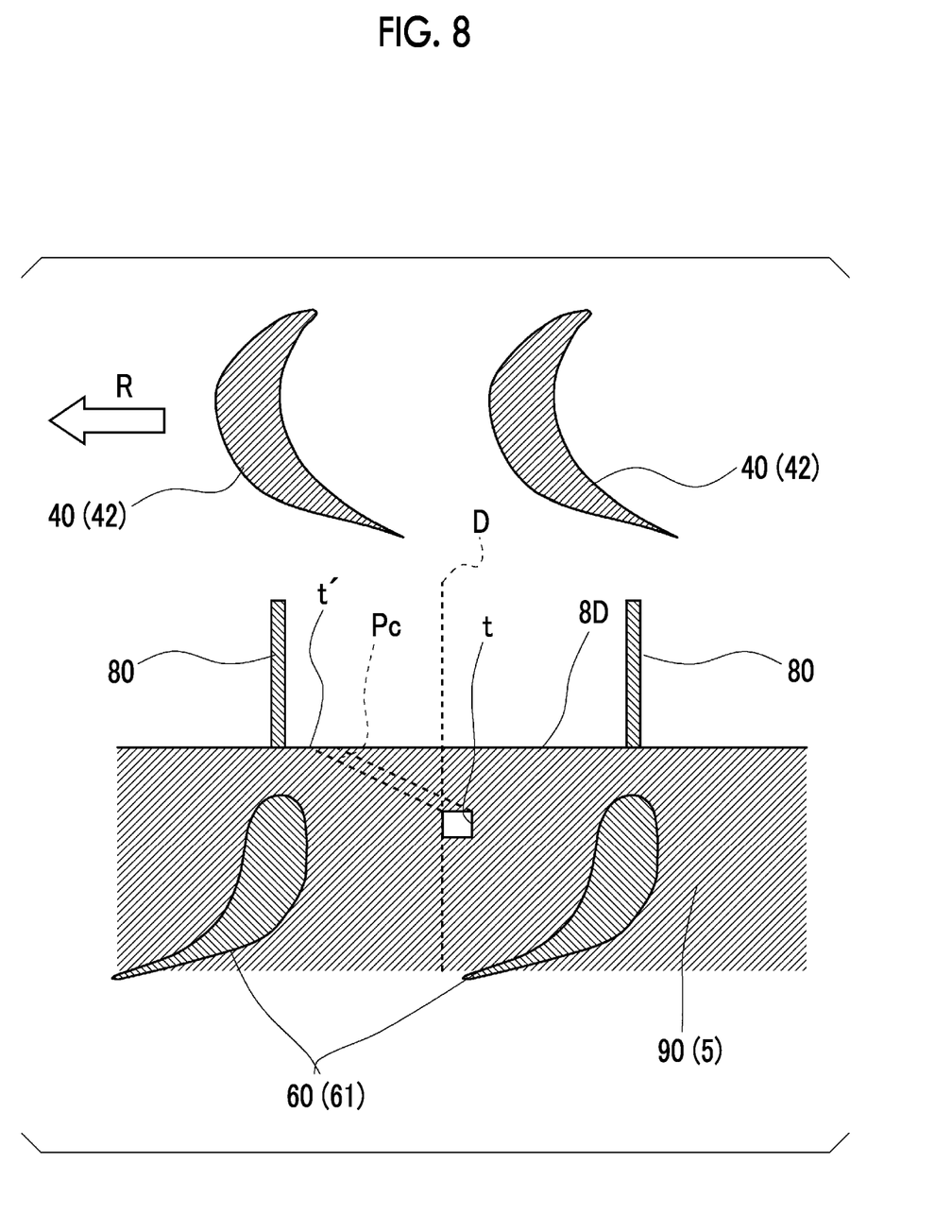
FIG. 8 is a diagram showing a casing of the steam turbine according to the third embodiment of the present invention, as viewed from the inner side in the radial direction.

Further, as shown in FIG. 8, in the present embodiment, when viewed from the inner side in the radial direction, the end portion t is formed at the position biased to the other side in the circumferential direction between the swirling prevention plates 80 adjacent to each other. More specifically, the end portion t is formed at the position biased toward a rear side in the rotation direction R of the rotor 2 with the bisector D between the swirling prevention plates 80 as the reference. Further, as shown in the drawing, an end portion t' on the upstream side of the bypass flow path Pc is located on the front side in the rotation direction R with the end portion t on the downstream side as the reference. That is, the bypass flow path Pc extends diagonally from the front side toward the rear side in the rotation direction R while going from the upstream side toward the downstream side.

According to the above configuration, the value of A/L satisfies the relationship of 0.2<A/L<0.4, whereby the end portion t on the downstream side of the bypass flow path Pc is formed at the position biased to the downstream side between the stator blades 60. Therefore, a secondary flow that occurs on the downstream side of the stator blade 60 can be blown off by the flow flowing out from the bypass flow path Pc. In this way, it is possible to suppress a decrease in the efficiency of the steam turbine 1 due to the influence of the secondary flow.

Further, according to the above configuration, the bypass flow path Pc extends toward the rear side in the rotation direction R of the rotor 2 while going from the upstream side toward the downstream side. In this way, the inflow angle (incidence) of the flow with respect to the stator blade 60 on the downstream side can be reduced. As a result, the flow (the main flow Fm) of the fluid in the steam turbine 1 can be further smoothed.

In addition, as shown in FIG. 8, the position in the circumferential direction of the end portion t is open at the position close to a pressure side (a pressure surface side) of the stator blade. In this way, it is possible to suppress the occurrence of a secondary flow on the pressure side (the pressure surface side) of the stator blade.

Figure 9:
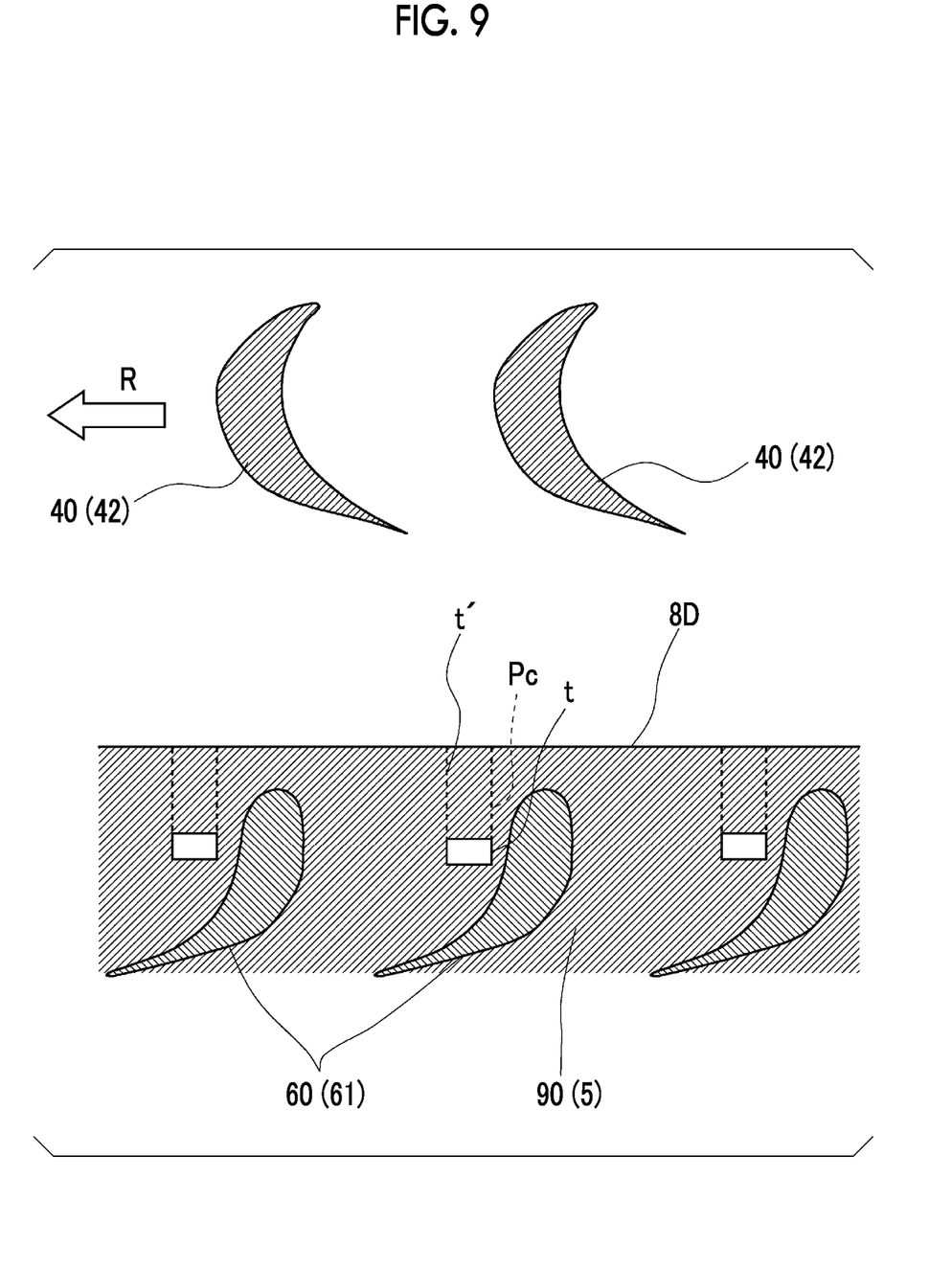
FIG. 9 is a diagram showing a casing of a steam turbine according to a modification example of the third embodiment of the present invention, as viewed from the inner side in the radial direction.

The third embodiment of the present invention has been described above. Various changes or modifications can be made to the above configuration without departing from the gist of the present invention. For example, in the third embodiment, the configuration in which the steam turbine 1 is provided with the swirling prevention plate 80 has been described. However, as shown in FIG. 9, it is also possible to adopt a configuration in which the swirling prevention plate 80 is not provided. In this case, in order to remove the swirling component of the leak flow Fs only through the bypass flow path Pc, unlike in the third embodiment, it is desirable that the bypass flow path Pc extends along the axis O when viewed from the radial direction.

Fourth Embodiment

Figure 10:
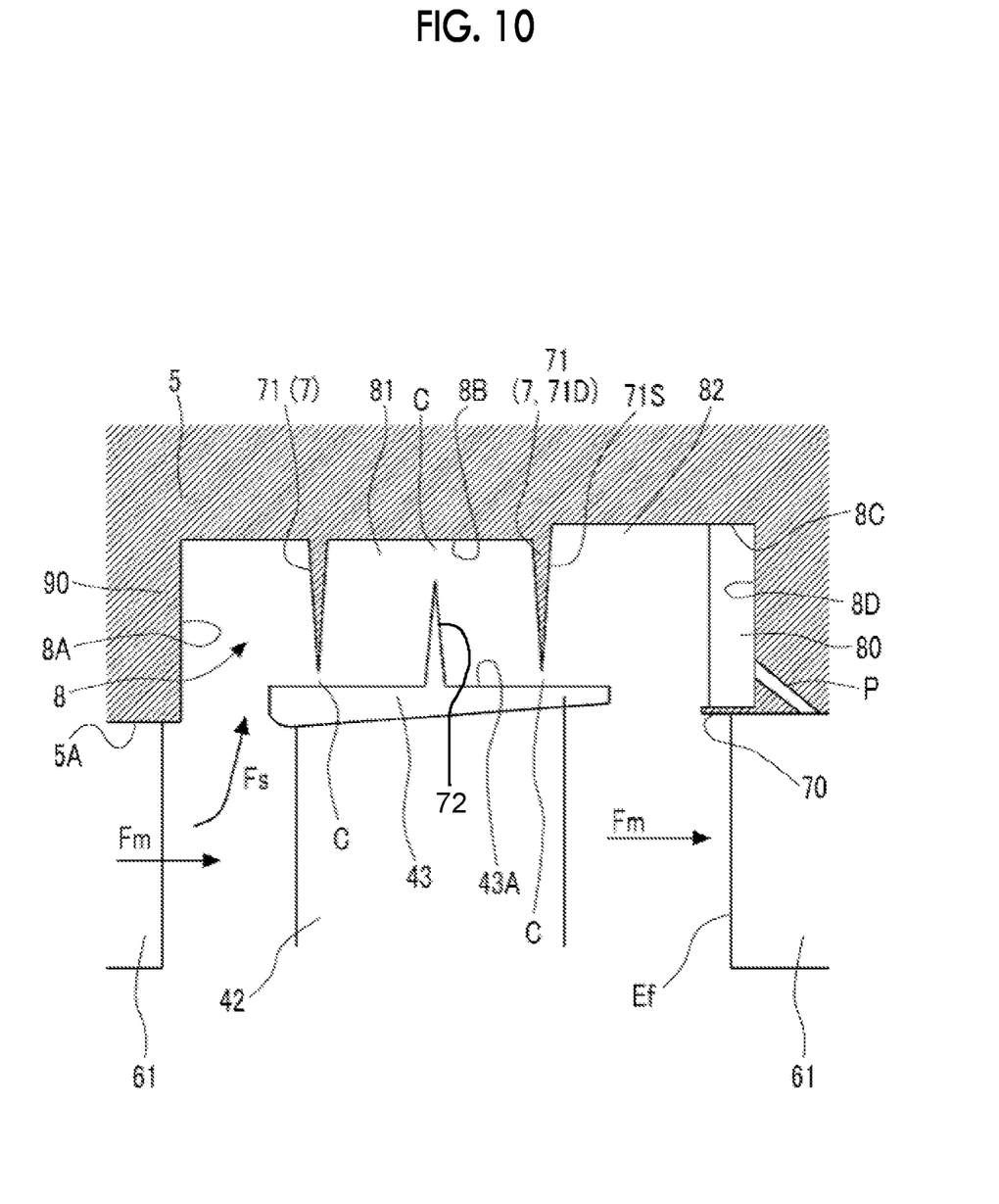
FIG. 10 is an enlarged sectional view of a main part of a steam turbine according to a fourth embodiment of the present invention.

Next, a fourth embodiment of the present invention will be described with reference to FIG. 10. The same configurations as those in each of the embodiments described above are denoted by the same reference numerals, and detailed description thereof is omitted. As shown in FIG. 10, in the present embodiment, the end edge on the downstream side of the swirling prevention plate 80 (that is, the recessed portion downstream surface 8D) is located on the downstream side with respect to the leading edge Ef of the stator blade body 61. That is, in the present embodiment, the interval in the direction of the axis O between the rotating blade 40 and the stator blade 60 is set to be smaller compared to that in the configuration of the first embodiment described above. In a case of adopting such a configuration, due to a restriction of a space, a construction method is used to secure a space for mounting the swirling prevention plate 80 by digging (cutting) the surface on the downstream side of the recessed portion 8 further toward the downstream side. In this way, the recessed portion downstream surface 8D is located on the downstream side with respect to the end edge (the leading edge Ef) on the upstream side of the stator blade 60 in the direction of the axis O.

According to the above configuration, the distance in the direction of the axis O between the rotating blade 40 and the stator blade 60 can be reduced. As a result, a loss or turbulence occurring in the main flow Fm can be further reduced compared to, for example, a case where the separation distance between the rotating blade 40 and the stator blade 60 in the direction of the axis O is large. Further, by adding the bypass flow path P to this configuration, it is possible to obtain the same operation and effect as those described in each of the embodiments described above. As a result, the efficiency of the steam turbine 1 can be further improved.

The fourth embodiment of the present invention has been described above. Various changes or modifications can be made to the above configuration without departing from the gist of the present invention. For example, it is also possible to combine the configurations described in the second embodiment or the third embodiment, and the modification examples thereof with the configuration of the present embodiment.

Fifth Embodiment

Figure 11:
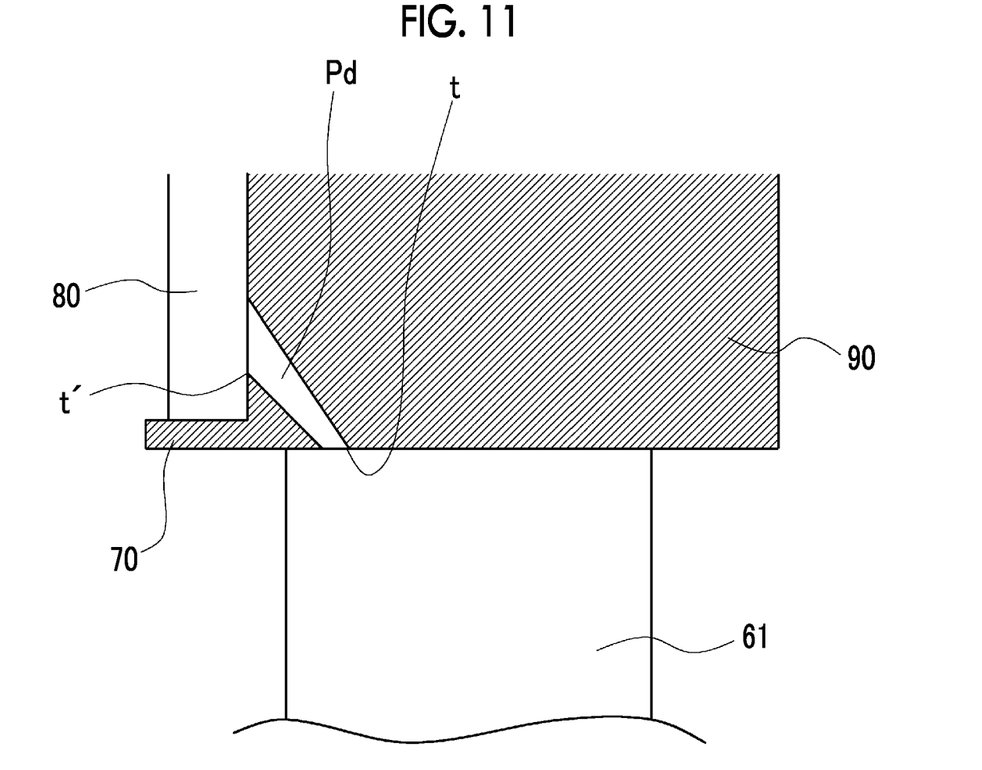
FIG. 11 is an enlarged sectional view of a main part of a steam turbine according to a fifth embodiment of the present invention.

Subsequently, a fifth embodiment of the present invention will be described with reference to FIG. 11. The same configurations as those in each of the embodiments described above are denoted by the same reference numerals, and detailed description thereof is omitted. As shown in FIG. 11, in the present embodiment, the configuration of a bypass flow path Pd is different from that in each of the embodiments described above. Specifically, a flow path cross-sectional area of the bypass flow path Pd gradually decreases while going from the upstream side toward the downstream side. That is, an opening area of the end portion t' on the upstream side of the bypass flow path Pd is larger than an opening area of the end portion t on the downstream side. The flow path cross-sectional area of the bypass flow path Pd linearly decreases from the end portion t' on the upstream side toward the end portion t on the downstream side.

According to the above configuration, the cross-sectional area of the bypass flow path Pd gradually decreases while going from the upstream side toward the downstream side. In this way, the flow velocity of the steam that is blown out from the bypass flow path Pd can be increased. As a result, the incidence of the flow on the stator blade 60 can be further optimized, and the influence of the secondary flow occurring around the stator blade 60 can be further reduced. In this way, the efficiency of the steam turbine 1 can be further improved.

Figure 12:
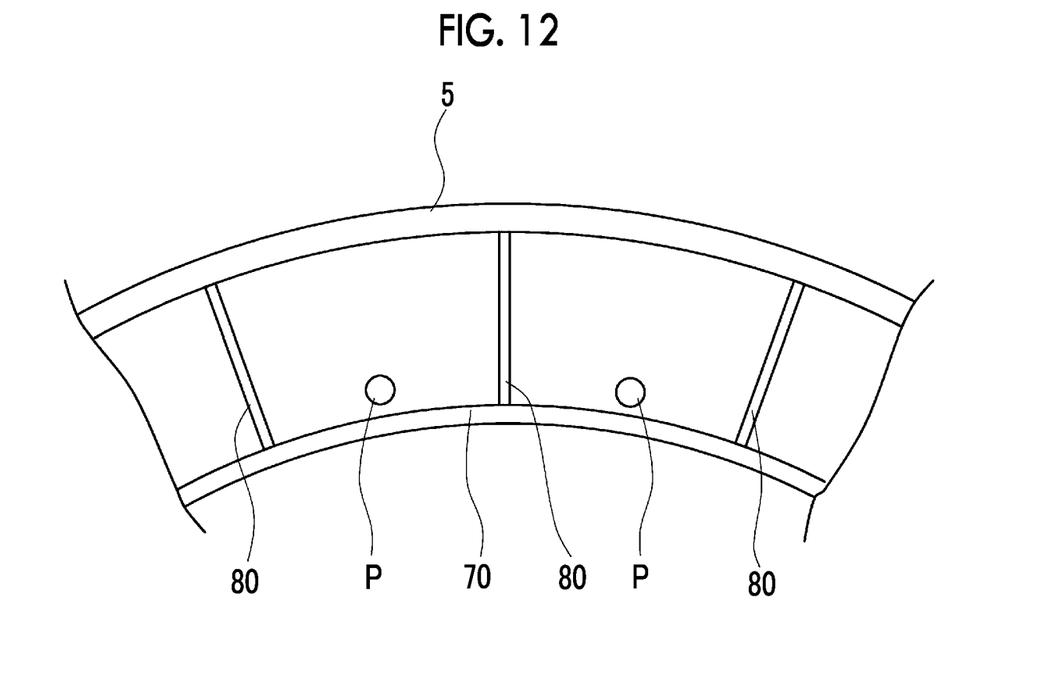
FIG. 12 is a diagram showing a modification example common to each embodiment of the present invention and is a view of the recessed portion downstream surface as viewed from the upstream side.

The fifth embodiment of the present invention has been described above. Various changes or modifications can be made to the above configuration without departing from the gist of the present invention. For example, in each of the embodiments described above, the example in which the cross-sectional shape of the bypass flow path P is a rectangular shape has been described. However, as a modification example common to each embodiment, as shown in FIG. 12, it is also possible to make the cross-sectional shape of the bypass flow path P a circular shape. According to this configuration, processing can be performed more easily compared to the case where the cross-sectional shape is a rectangular shape. In this way, manufacturing costs or maintenance costs can be reduced.

REFERENCE SIGNS LIST

1: steam turbine
2: rotor

3: bearing device
4: rotating blade row
5: casing
5A: casing inner peripheral surface
6: stator blade row
7: fin
8: recessed portion
31: journal bearing
32: thrust bearing
40: rotating blade
41: rotating blade platform
42: rotating blade body
43: rotating blade shroud
43A: shroud outer peripheral surface
51: turbine inlet
52: exhaust hood
60: stator blade
61: stator blade body
62: stator blade inner ring
71: casing-side fin
71D: downstream-side fin
71S: fin downstream surface
72: rotating blade-side fin
81: first region
82: second region
8A: recessed portion upstream surface
8B: facing surface
8C: downstream-side facing surface
8D: recessed portion downstream surface
C: clearance
Fb: bypass flow
Fm: main flow
Fr: return flow
Fs: leak flow
Ft: penetration flow
O: axis
P, Pb, Pc, Pd: bypass flow path
t: end portion on the downstream side
t': end portion on the upstream side
V1: vortex

The invention claimed is:

1. An axial flow turbine comprising:
a rotor extending along an axis;
a plurality of rotating blades each having a rotating blade body extending from the rotor outward in a radial direction and a shroud provided at an outside end portion of the rotating blade body in the radial direction, and arranged at intervals in a circumferential direction;
a casing surrounding the rotating blades from an outer side in the radial direction and having a recessed portion formed on an inner peripheral surface to accommodate the shrouds;
a fin protruding from a facing surface of the recessed portion of the casing, which faces the shroud, inward in the radial direction, wherein a clearance is formed between the fin and an outer peripheral surface of the shroud;
a stator blade support portion disposed close to a downstream end of the rotor with respect to the recessed portion on the inner peripheral surface of the casing;
a plurality of stator blades each extending from the stator blade support portion inward in the radial direction and arranged at intervals in the circumferential direction; and
an annular partition plate extending from a recessed portion downstream surface of the recessed portion, which is a surface on close to the downstream end of the rotor, toward an upstream end of the rotor and centered on the axis,
wherein a bypass flow path, is formed in the casing, wherein the bypass flow path has a first end formed in the recessed portion downstream surface and a second end formed in the inner peripheral surface of the casing.

2. The axial flow turbine according to claim 1, wherein the bypass flow path extends from an outside of the casing toward an inside thereof in the radial direction and from the upstream end of the rotor to the downstream end thereof, when viewed in a cross section that includes the axis.

3. The axial flow turbine according to claim 1, wherein the bypass flow path is extended rearward in a rotation direction of the rotor as moving from the upstream end of the rotor to the downstream end thereof, when viewed from an outside of the casing in the radial direction.

4. The axial flow turbine according to claim 1, wherein when a first dimension of the stator blade support portion in a direction of the axis is denoted by L and a second dimension from an upstream end edge of the stator blade support portion to a downstream end portion of the bypass flow path in the direction of the axis is denoted by A, a value of A/L satisfies a relationship of $0<A/L<0.15$.

5. The axial flow turbine according to claim 1, wherein when a first dimension of the stator blade support portion in a direction of the axis is denoted by L and a second dimension from an upstream end edge of the stator blade support portion to a downstream end portion of the bypass flow path in the direction of the axis is denoted by A, a value of A/L satisfies a relationship of $0.2<A/L<0.4$.

6. The axial flow turbine according to claim 1, wherein the recessed portion downstream surface is located close to the downstream end of the rotor with respect to an upstream end edge of the stator blade in a direction of the axis.

7. The axial flow turbine according to claim 1, wherein a flow path cross-sectional area of the bypass flow path gradually decreases while going from the first end of the bypass flow path, which is an upstream end of the bypass flow path, toward the second end of the bypass flow path, which is a downstream end of the bypass flow path.

8. The axial flow turbine according to claim 1, wherein the bypass flow path has a circular cross-sectional shape.

9. The axial flow turbine according to claim 1, further comprising:
a plurality of swirling prevention plates extending from an outer peripheral surface of the partition plate toward an inner peripheral surface of the recessed portion and arranged at intervals in the circumferential direction.

* * * * *